United States Patent [19]

Kasle

[11] Patent Number: 5,396,073
[45] Date of Patent: Mar. 7, 1995

[54] CIRCUIT FOR HIGH RESOLUTION DECODING OF MULTI-ANODE MICROCHANNEL ARRAY DETECTORS

[75] Inventor: David B. Kasle, Woodside, Calif.

[73] Assignee: The United States of America as represented by the Administrator of the National Aeronautics and Space Administration, Washington, D.C.

[21] Appl. No.: 880,099

[22] Filed: May 7, 1992

[51] Int. Cl.$^6$ .............................................. G01T 1/18
[52] U.S. Cl. .......................... 250/385.1; 250/214 VT; 364/413.13
[58] Field of Search ..................... 250/385.1, 214 VT; 364/413.13; 348/218, 294

[56] References Cited

U.S. PATENT DOCUMENTS

| | | | |
|---|---|---|---|
| 3,934,143 | 1/1976 | Prag | 250/370 |
| 4,070,578 | 1/1978 | Timothy et al. | 250/336.1 |
| 4,639,601 | 1/1987 | Pullan | 250/385.1 |
| 4,727,256 | 2/1988 | Kumazawa | 250/370 |
| 4,956,796 | 9/1990 | Rogers et al. | 364/581 |
| 5,081,597 | 1/1992 | Kowalski | 364/525 |
| 5,241,569 | 8/1993 | Fleming | 379/159 |

OTHER PUBLICATIONS

David B. Kasle, "High Resolution Decoding Techniques and Single Chip Decoders for Multi-Anode Microchannel Arrays", Aug. 1989.
Kasle & DeMicheli, "An Image Decoding ASIC for Space-Based Applications", May 27, 1991.
Kasle & Morgan, "High Resolution Decoding of Multi-Anode Microchannel Array Detectors", 24 Jul., 1991.

*Primary Examiner*—Paul M. Dzierzynski
*Assistant Examiner*—David V. Bruce
*Attorney, Agent, or Firm*—Robert D. Marchant; Guy M. Miller

[57] ABSTRACT

A circuit for high resolution decoding of multi-anode microchannel array detectors consisting of input registers accepting transient inputs from the anode array, anode encoding logic circuits connected to the input registers, midpoint pipeline registers connected to the anode encoding logic circuits and pixel decoding logic circuits connected to the midpoint pipeline registers. A high resolution algorithm circuit operates in parallel with the pixel decoding logic circuit and computes a high resolution least significant bit to enhance the multi-anode microchannel array detector's spatial resolution by halving the pixel size and doubling the number of pixels in each axis of the anode array. A multiplexer is connected to the pixel decoding logic circuit and allows a user selectable pixel address output according to the actual multi-anode microchannel array detector anode array size. An output register concatenates the high resolution least significant bit onto the standard ten bit pixel address location to provide an eleven bit pixel address, and also stores the full eleven bit pixel address. A timing and control state machine is connected to the input registers, the anode encoding logic circuits, and the output register for managing the overall operation of the circuit.

7 Claims, 11 Drawing Sheets

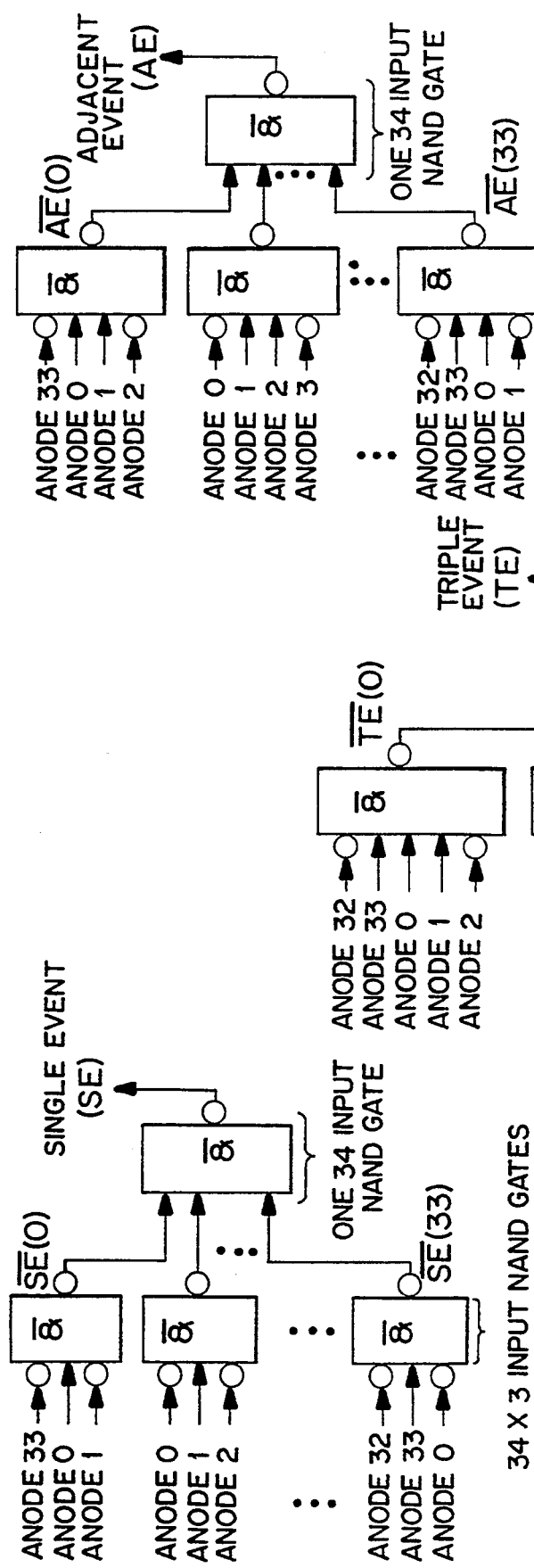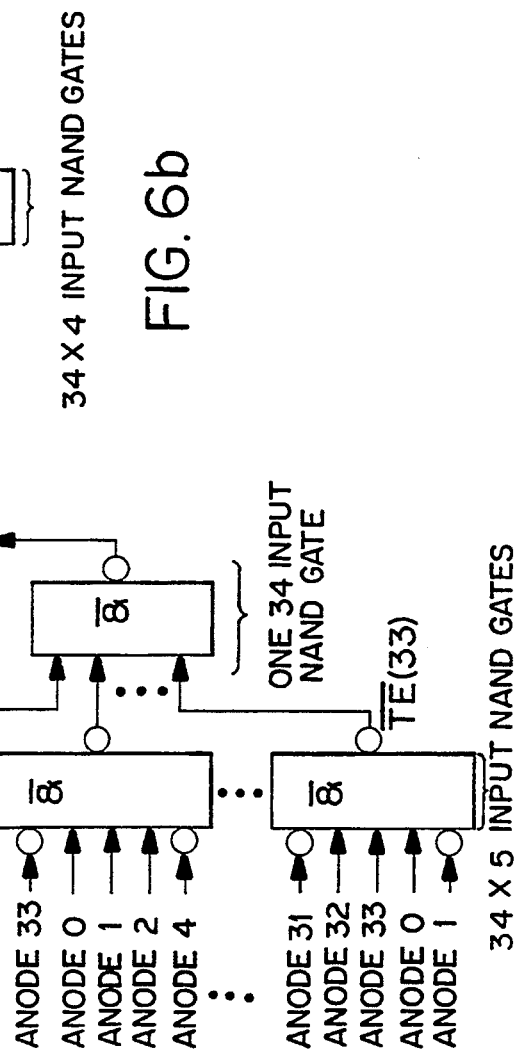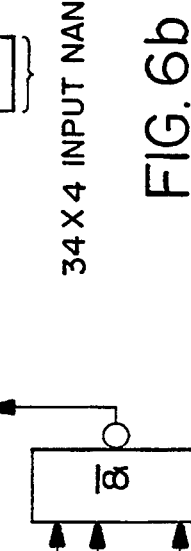
FIG. 6a
FIG. 6b
FIG. 6c

HIGH RESOLUTION

LOW RESOLUTION
(2X MAGNIFICATION)

CIRCUIT FOR HIGH RESOLUTION DECODING OF MULTI-ANODE MICROCHANNEL ARRAY DETECTORS

ORIGIN OF THE INVENTION

The invention described herein was made by an employee of the United States Government, and may be manufactured and used by or for the Government for governmental purposes without the payment of any royalties thereon or therefor.

TECHNICAL FIELD

This invention relates to a circuit for high resolution decoding of multi-anode microchannel array detectors which includes enhancement of the high resolution by parallel processing of the least significant bit during the normal signal processing period.

BACKGROUND ART

The multi-anode microchannel array (MAMA) detector employs a photocathode for photon/electron conversion, a microchannel plate (MCP) for electron multiplication and a proximity focused anode array combined with charge amplifiers for event detection. Digital decoding electronics interpret the charge amplifier outputs to determine the pixel position of an event. The block diagram of a prior art MAMA detector is shown in FIG. 1.

The current generation of prior art MAMA detectors employ arrays which consist of two sets of interleaved anodes in a repeating series (see FIG. 2) which for historical reasons are called "fine-fine" anode arrays. The first set of anodes is on top and consists of n anodes (which repeats for n+2 cycles) and the second set is on the bottom and consists of n+2 anodes (which repeats for n cycles). This results in a total of n*(n+2) pixels, where n must be even to insure unique decoding over the entire array. Another pair of anode sets (not shown in FIG. 2) of m and m+2 anodes run underneath and perpendicular to the first pair of anode sets, resulting in a total of m*(m+2) pixels in the perpendicular axis. A pixel is defined as spanning from one anode's center line to the next anode's center line.

The configuration of a fine-fine array requires a complex algorithm involving coincidence discrimination for determining the position of a given photon event. Coincidence discrimination is the process of taking two or more anodes which experience electron pulses which are coincident in time and inferring the pixel location of the event in the anode array from the combination of anodes. While coincidence discrimination requires a more complex position decoding algorithm than would be needed for a configuration of discrete anodes (i.e. a separate and unique anode for each pixel), it requires far fewer anodes and therefore far fewer charge amplifiers.

The size of the electron cloud due to a single photon event varies depending on the characteristics of the microchannel plate or, simply, MCP as well as bias voltages applied to the photocathode, MCP and anode array. The electron cloud diameter is quantized by the total number of anodes illuminated in a given axis, also referred to as the order of the fold. For example, a three-fold designates the situation in which three contiguous anodes are struck by sufficient numbers of electrons to have voltages greater than some user-specified threshold. A scaled-down version of one axis of a fine-fine anode array (n=4) with one-, two-, three-, and fourfolds is shown in FIG. 2. The electron cloud diameter must be sufficient to illuminate at least two anodes (a two-fold) in order to allow for the unique decoding of the position of the event. Owing to size variations in the electron cloud emanating from the MCP, the decoding algorithm must be capable of coping with higher-order folds. As FIG. 2 illustrates, every higher-ordered fold can be reduced to an equivalent two-fold (that two-fold which occupies the same pixel as the higher-ordered fold). Notice that in .the case of a three-fold (or any odd-fold) there are two possible equivalent two-folds. A decoder's function is to take an arbitrarily ordered fold and infer the corresponding pixel position of the event. Since there is one decoder input for each anode, a single axis requires 2n+2 inputs. A typical value for n is 32, in which case the decoder must accommodate 66 inputs or a single axis of the detector. Because of the large number of inputs and complicated requirements for legal events, event decoding cannot easily be reduced to a single step process. The algorithm for event decoding is therefore divided into two stages: anode encoding, which is the process of converting a k-fold into the equivalent two-fold for arbitrary k (see FIG. 2); and pixel decoding, which is the process of translating the equivalent two-fold into the corresponding pixel position.

STATEMENT OF THE INVENTION

It is therefore an object of the present invention to improve the multi-anode microchannel array detector's pixel spatial resolution.

This and other objects are achieved by providing a new algorithm incorporated into a CMOS Application Specific Integrated Circuit (ASIC) decoder which improves the MAMA detector's pixel spatial resolution. The circuitry which implements the new algorithm does not degrade the detector throughput and does not require any modifications to the detector tube. The standard MAMA detector has a pixel size of 25×25 microns, but with the new decoder circuit the pixel size is reduced to 12.5×12.5 microns.

BRIEF DESCRIPTION OF THE DRAWINGS

FIG. 6a illustrates the circuit which determines whether there is a single event in a given set of anodes.

FIG. 6b illustrates the circuit which determines whether there is an adjacent event in a given set of anodes.

FIG. 6c illustrates the circuit which determines whether there is a triple event in a given set of anodes.

DETAILED DESCRIPTION OF THE INVENTION

I have designed a new Application Specific Integrated Circuit (ASIC) which serves as a decoder for MAMA detectors. The MAMA decoder ASIC was fabricated as a 1.5 micron CMOS gate array. This chip includes circuitry which implements a new algorithm for improving the spatial resolution of a MAMA detector. The high resolution circuitry and its associated algorithm are described below.

Figure 1:
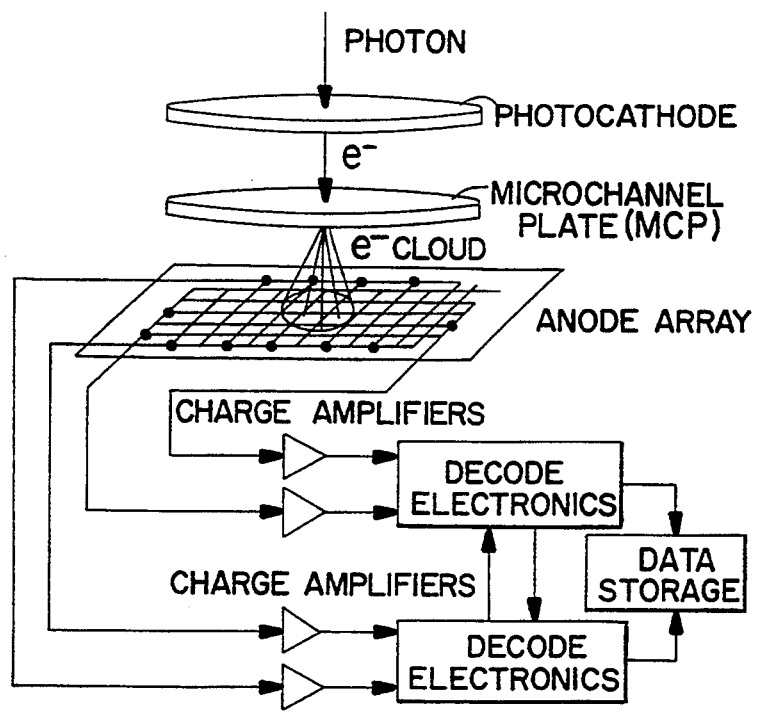
FIG. 1 is a block diagram of a prior art Multi-Anode Microchannel Array detector.
Figure 2:
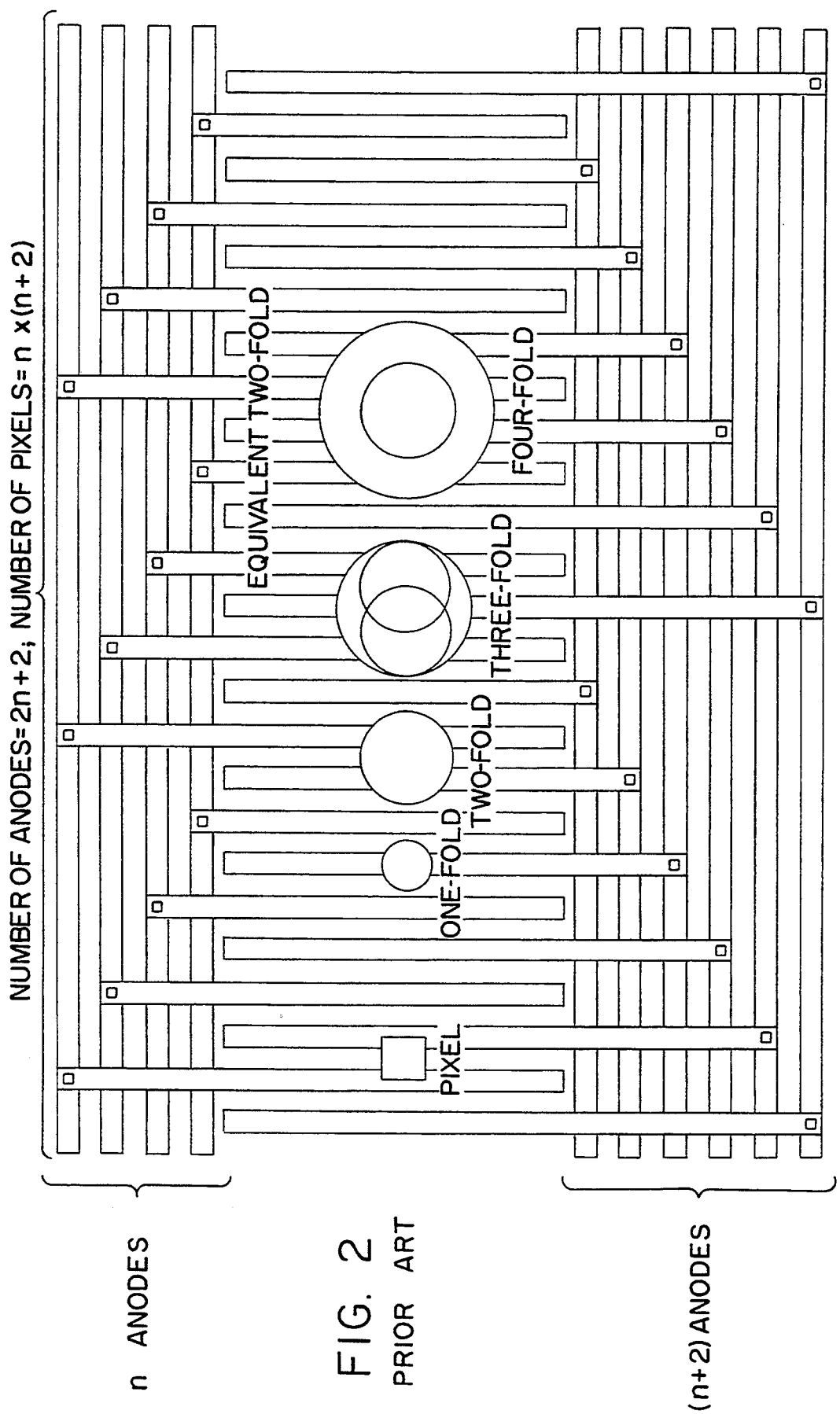
FIG. 2 is a depiction of a prior art fine-fine array single axis with multi-folds.
Figure 3:
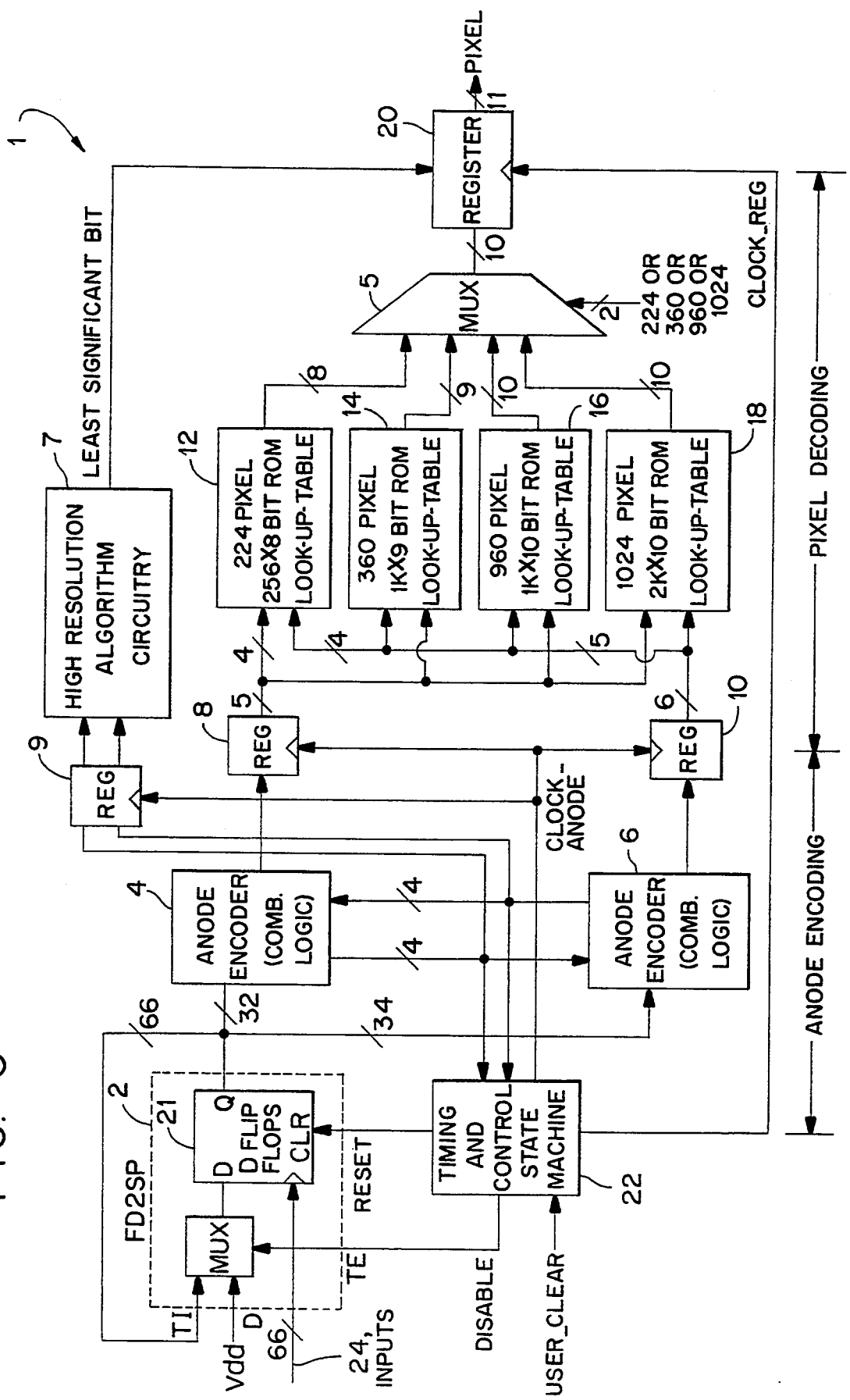
FIG. 3 is a simplified block diagram of the MAMA decoder Application Specific Integrated Circuit of the present invention.

A simplified block diagram of my MAMA decoder ASIC 1 is shown in FIG. 3. The circuit consists of input registers 2, anode encoding logic 4 & 6, midpoint pipeline registers 8, 9 & 10, pixel decoding logic 12, 14, 16 & 18, output register 20 and a timing and control state machine 22 to manage the overall operation. The decoder ASIC operates in the following manner: transient inputs 24 (which are not always precisely coincident in time or of uniform duration due to sensitivity-and speed variations in the individual charge amplifiers) are stored in edge-triggered flip-flops 21. Because the inputs 24 to the decoder inputs are connected directly to the clock pins of flip-flops 21, flip-flops 21 act as edge-triggered latches. The occurrence of an event in any one of the input lines initiates a sequence of actions within timing and control state machine 22. The maximum allowed delay between the earliest and latest charge amplifier outputs from a single event is called the amplifier skew. After a user controlled period corresponding to the amplifier skew, state machine 22 connects the Q outputs with the D inputs of input flip-flops 21, thereby freezing the state of flip-flops 21. Multiple blocks of parallel combinational logic 4, 6, perform the anode encoding (mentioned earlier) of the inputs into the equivalent twofold. After another user-specified period (corresponding to the time required for anode encoding), state machine 22 stores the equivalent two-fold and the number of anodes asserted in each axis in midpoint pipeline data registers 8, 9 and 10. At this time, pixel decoding begins and a new event may start the anode encoding process. The pixel decoding process is performed by ROM Look-Up Tables 12, 14, 16 and 18 (LUTs) which convert the equivalent twofold output of midpoint registers 8 and 10 into the corresponding pixel location. The equivalent two-fold is simultaneously decoded in parallel for array sizes of 224, 360, 960 and 1024 pixels. The pixel address output is user-selectable by multiplexer 5 according to the actual MAMA detector anode array size in use. While the standard pixel address is being computed, circuitry 7, which computes a high resolution least significant bit, operates in parallel. This extra least significant bit enhances the MAMA detector's spatial resolution by halving the pixel size and doubling the number of pixels in each axis. The high resolution least significant bit is concatenated onto the standard pixel address, at which point the full eleven bit address is stored in output register 24. Output register 24 maintains a valid pixel address while new inputs are propagating through the circuit.

The gate array design decodes any user selected combination of two-, three-, four-, five- and six-folds. Since odd-ordered folds have two possible equivalent twofolds and therefore correspond to two possible pixels, they can be handled by choosing the left pixel, choosing the right pixel, or alternating between the two. The ASIC can decode a single axis of 224, 360, 960 or 1024 pixels; it thus serves as a universal decoder, capable of interpreting the output of any of the currently existing MAMA detectors which utilize the fine-fine anode arrays. For example, a 360 by 1024 pixel MAMA detector would require one decoder chip for the 360 pixel axis and another for the 1024 pixel axis. Although both of these decoder ASICs are identical, one chip would act as the timing master and the other chip would serve as the timing slave, with communication between the two carried out by dedicated handshake lines. In the event that the slave detects an event input when the master does not, the slave can send a handshake signal to the master causing the master to reset itself as well as the slave, leaving both chips ready to accept new event inputs.

Figure 4:
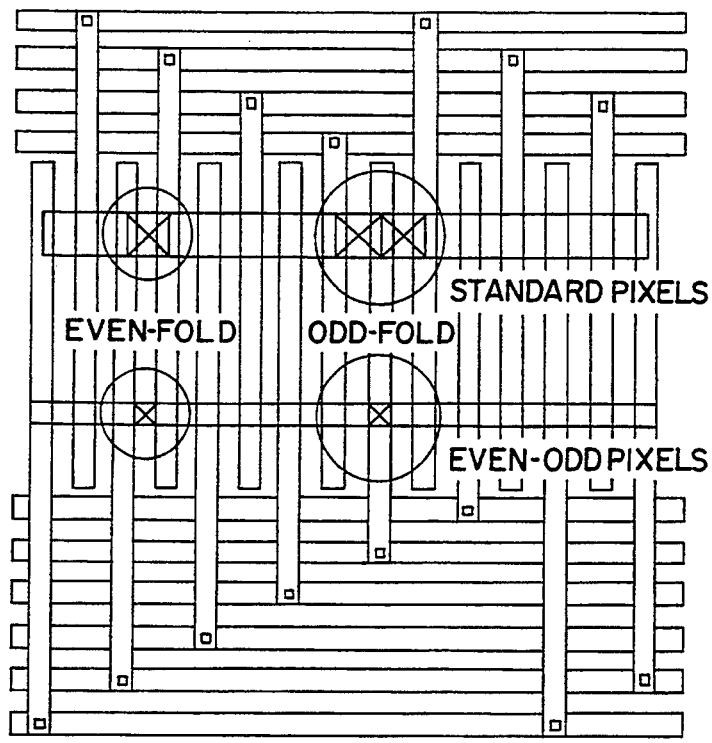
FIG. 4 illustrates normal resolution versus high resolution achieved with even-odd discrimination.
Figure 5:
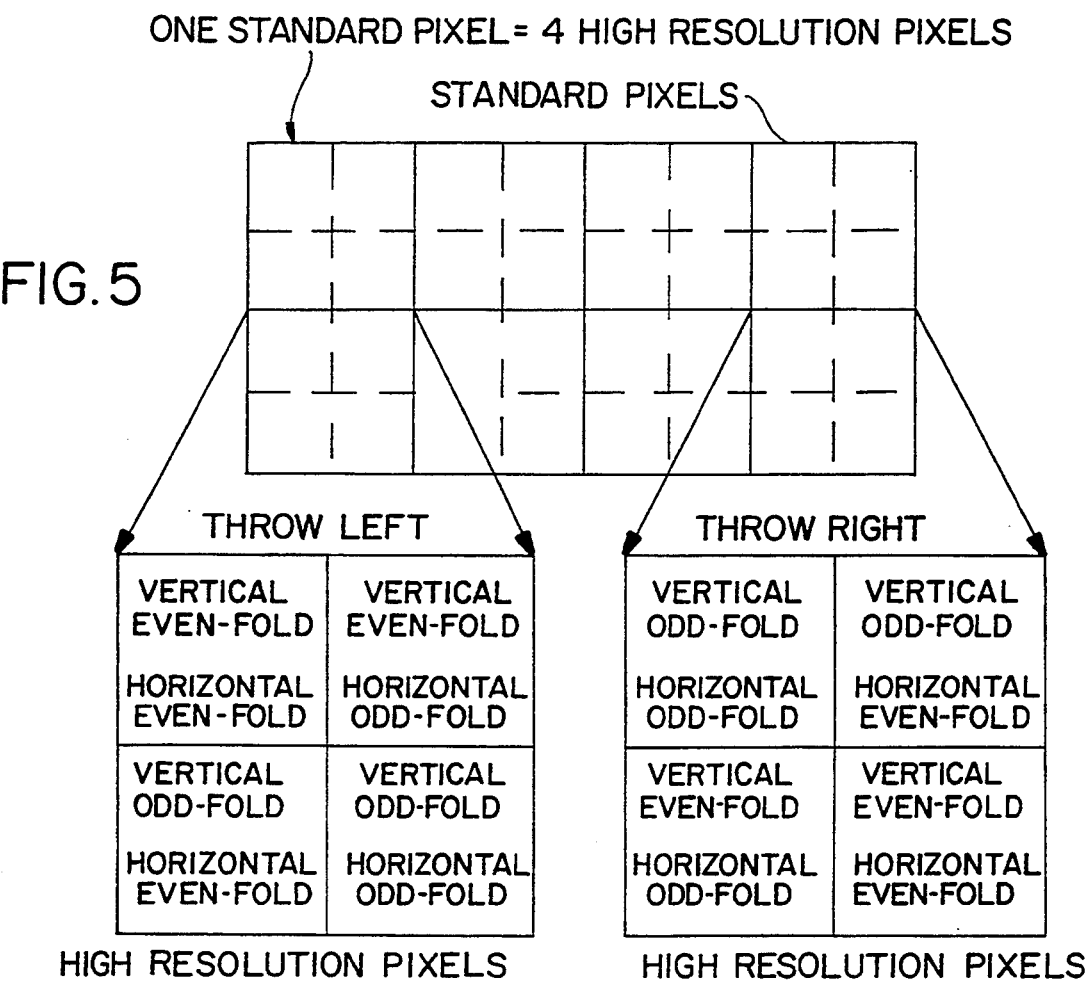
FIG. 5 illustrates how each standard pixel is converted into four high resolution pixels in a two dimensional array.

The special feature incorporated into MAMA decoder ASIC 1 is high resolution decoding. In a standard MAMA detector pixel size is equal to the spacing of the anodes, but the spatial resolution of the MCP is generally about twice that of the anode array. This implies that the detector is capable of spatial resolution twice as high as that achieved with the original fine-fine decoding scheme. It is possible to increase the resolution of the detector without changing the detector itself, but only by altering the readout electronics. Presented here is a new technique for halving the pixel size which I call even-odd discrimination. This new algorithm is incorporated into the decoder ASIC 1 as a user-selectable mode, which enabled the first tests of this technique as described below. Even-odd discrimination involves differentiating between even-folds and odd-folds to generate a single least significant bit (LSB), thereby halving the pixel size and doubling the number of pixels in each axis. The value of the least significant bit depends on whether the throw left or the throw right option is used for handling odd-ordered folds. In the case of throw left, the LSB is high only if the event is an odd-fold, whereas in the case of throw right, the LSB is high only if the event is an even-fold and is low otherwise. This operation can be performed in parallel with the standard decoding procedure with no loss of decoder speed and requires only the addition of minimal hardware to the standard decoding circuitry (although the memory size must be quadrupled). FIG. 4 illustrates normal resolution (labeled STANDARD PIXELS) versus high resolution achieved with even-odd discrimination (labeled EVEN-ODD PIXELS). Standard pixels are twice the size, and span from the center of one anode to the next, whereas the even-fold pixels are centered between the anodes and the odd-fold pixels are centered on the anodes themselves. FIG. 5 illustrates how each standard pixel is converted into four high resolution pixels in a two dimensional array. There are two possibilities: if odd-folds are always binned in the left hand standard-size pixel (the "throw left" option), then odd-fold pixels have an LSB of one and even-fold pixels have an LSB of zero. Conversely, if odd-folds are always binned in the right hand standard-size pixel (the "throw right" option), then odd-fold pixels have an LSB of zero and even-fold pixels have an LSB of one. The major difference between even-odd discrimination and previous decoding schemes is that previous decoders made no use of the information contained in whether an event generated an even-fold or an odd-fold.

Figure 7:
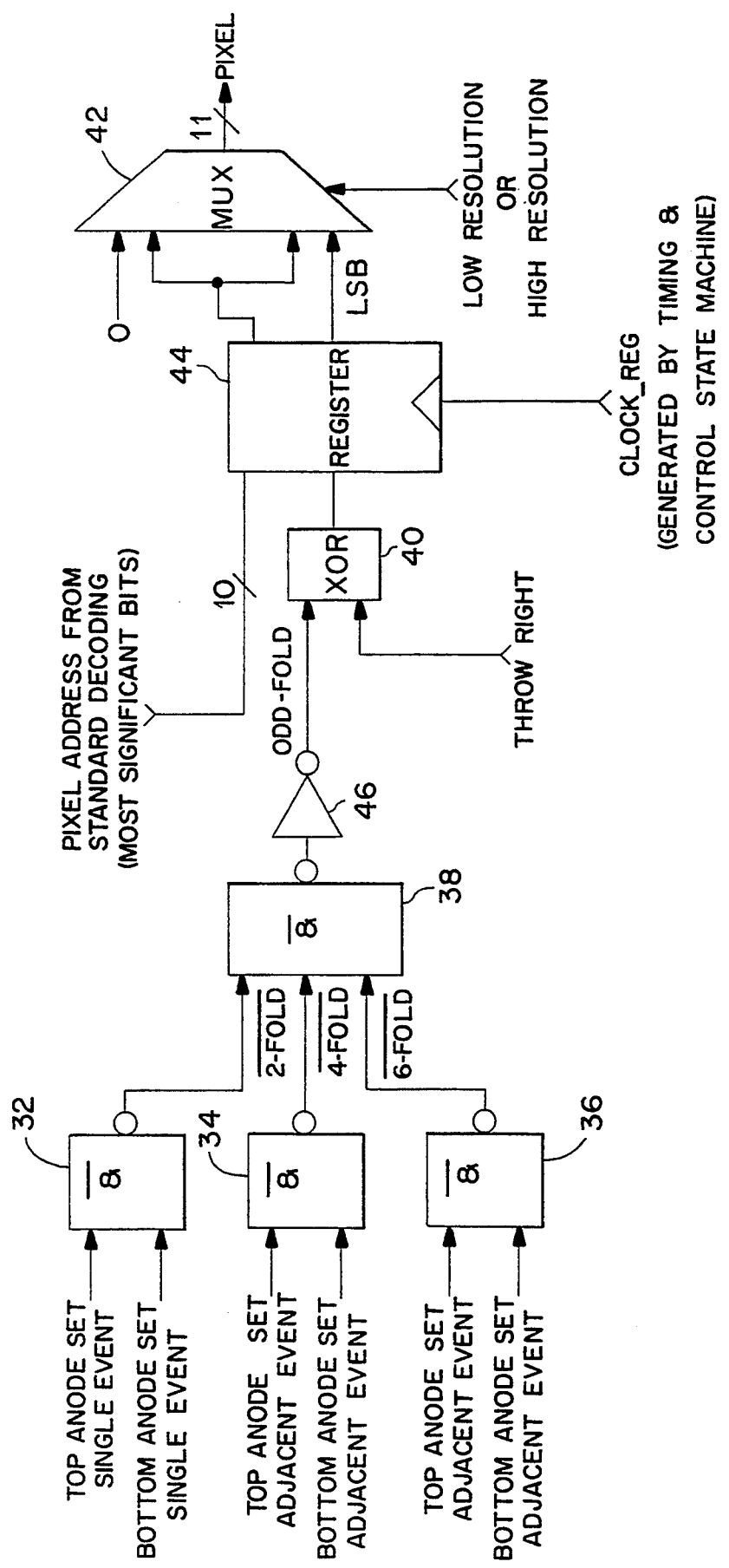
FIG. 7 depicts the circuit which determines if an event is an even-fold or an odd-fold and sets the LSB accordingly.

The circuitry which implements this algorithm is shown in FIGS. 6a, 6b, 6c and 7. The first task required is that of determining whether the current event is an even-fold or an odd-fold. Each anode set is examined separately to determine the number of active anodes: one (single event), two (adjacent event) or three (triple event). By combining the information from both anode sets of a single axis, the order of the fold may be determined. For example, a single event in the top set of anodes combines with an adjacent event in the bottom set of anodes to make a 3-fold. FIGS. 6a-6c illustrate the circuits which determine whether there is a single event (FIG. 6a), adjacent event (FIG. 6b) or triple event (FIG. 6c) in a given set of anodes. For each possible anode or anode combination, the circuits search for one, two or three anodes which are illuminated surrounded by unilluminated anodes on either side. Logical NAND gates search for single events, adjacent events and triple events at each anode location. In each of the three cases, the outputs of the NAND gates are logically NANDed together forming a logical sum-of-products expression to determine if there is a single event, adjacent event or triple event. There are two sets of this circuitry, examining both sets of anodes in a given axis of the detector. An even-fold event is either a two-fold, four-fold or six-fold, corresponding to a pair of single events, a pair of adjacent events or a pair of triple events, respectively. FIG. 7 depicts the circuit which determines if an event is an even-fold or an odd-fold and sets the LSB accordingly. Three NAND gates 32, 34, 36, in the left side of FIG. 7 determine whether there is a two-fold, four-fold or six-fold. The three NAND gate outputs are inputs to NAND gate 38, the output of which is inverted by inverter 46, whose output is asserted if the current event is an odd-fold. The high resolution LSB is determined by exclusive OR 40 (XOR) of the odd-fold signal and the throw right signal (a user input) and the LSB is stored in register 44. Finally, if the decoder chip is in high resolution mode, multiplexer 42 concatenates the high resolution LSB to the most significant bits which were determined in a separate parallel operation.

Figures 8A, 8B:
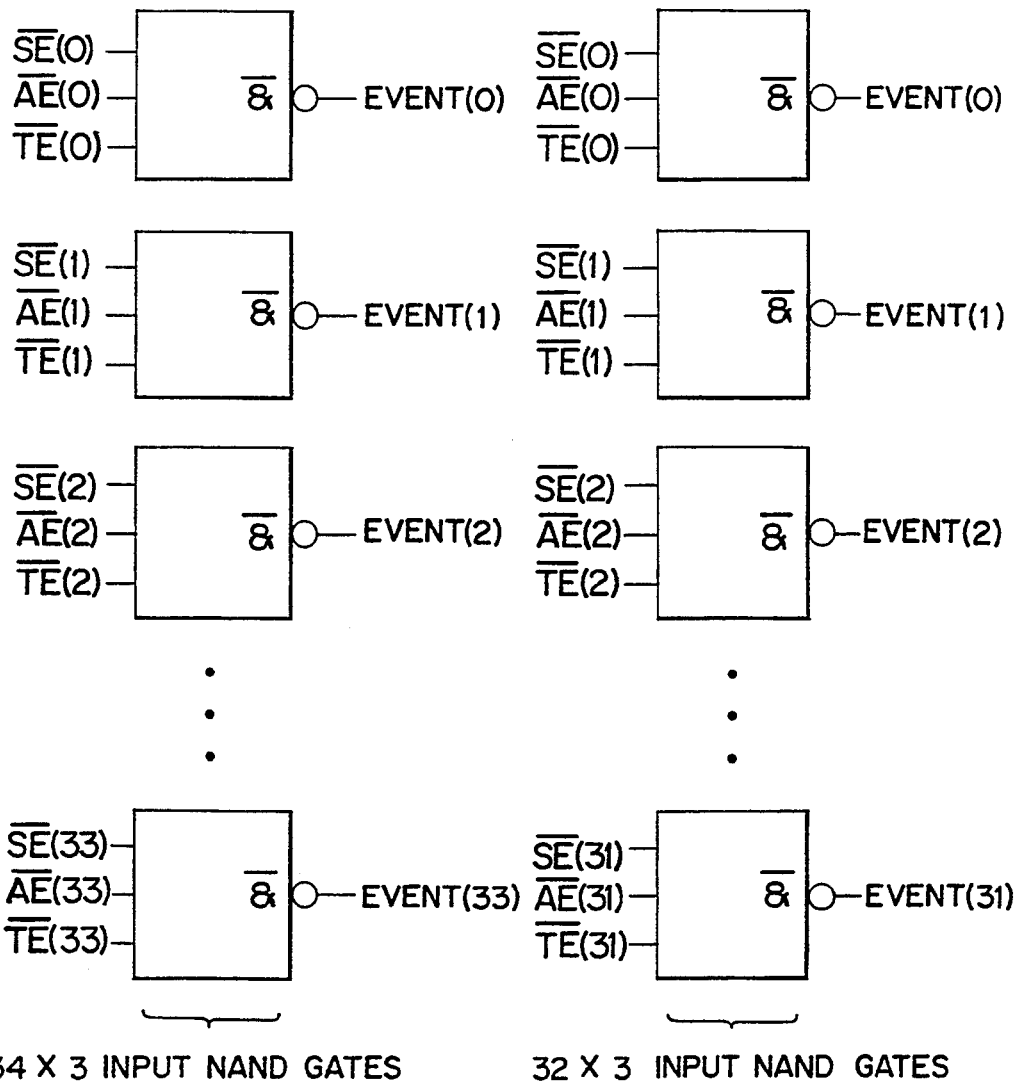
FIG. 8a depicts the circuit which determines which of the top set of anodes have an event occurring, either single, adjacent or triple.
FIG. 8b depicts the circuit which determines which of the bottom set of anodes have an event occurring, either single, adjacent or triple.
Figure 9:
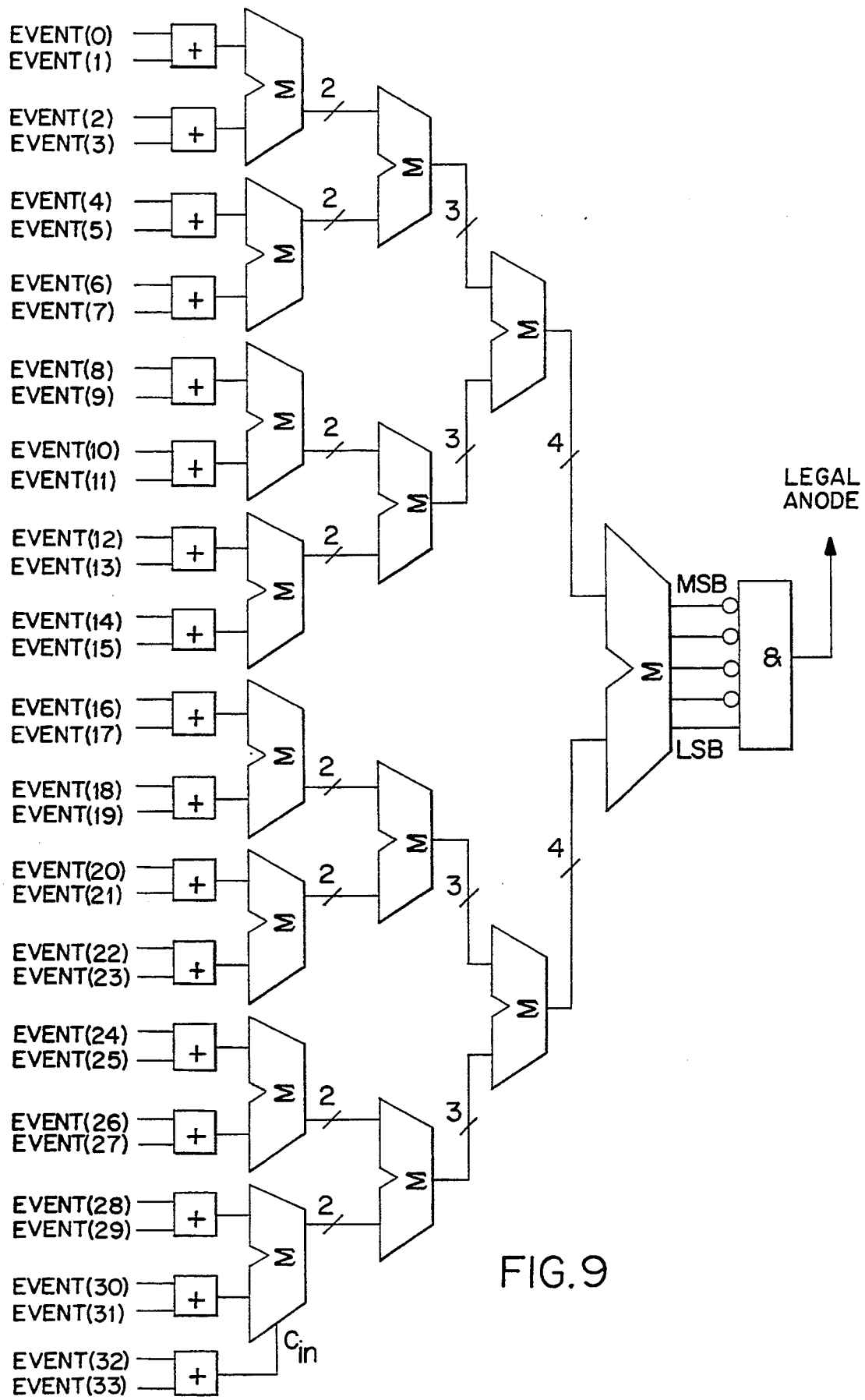
FIG. 9 depicts the circuit which determines if the asserted anodes in a given set of anodes (either top or bottom) are legal, i.e., that there is one and only one event occurring.
Figure 10:
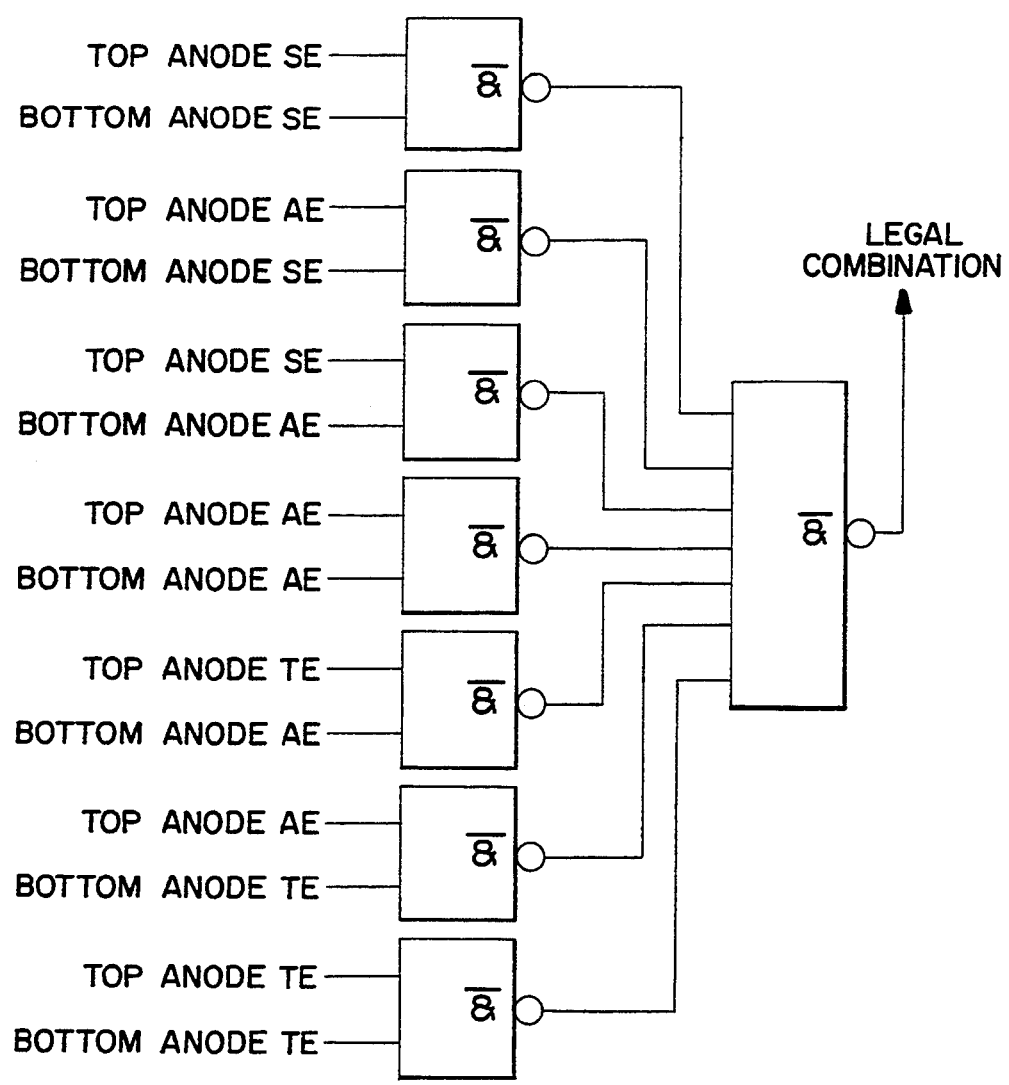
FIG. 10 depicts the circuit which determines if the asserted anodes in both sets of anodes (top and bottom) form a legal combination.

Besides determining the value of the high resolution least significant bit, the MAMA decoder ASIC 1 must verify the validity of the current event. This verification is performed by the circuitry shown in FIGS. 8a, 8b, 9 and 10. The individual anode single, adjacent and triple event complementary signals (SE(i), AE(i) and TE(i) where i is the anode number) which were generated by the circuits shown in FIGS. 6a, 6b and 6c serve as the inputs to the circuits shown in FIGS. 8a and 8b. The circuits shown in FIGS. 8a and 8b use NAND gates to combine the three signals SE(i), AE(i) and TE(i) for each anode, i, to determine if each anode has an event, denoted EVENT(i) for anode i. The EVENT(i) signals are inputs to the circuit shown in FIG. 9, which requires that one and only one of the input signals be asserted in order for the event to be legal. Because of the way in which the anode encoders 4 and 6 (shown in FIG. 3) define single, adjacent and triple events, it is not possible for two contiguous anodes to have events. For example, anodes 8 and 14 (which are not contiguous) could have simultaneous events, but anodes 8 and 19 (which are contiguous) could not have have simultaneous events. Therefore the circuit in FIG. 9 uses OR gates to combine contiguous anode event signals, thereby halving the width of the data path. The data path width is successively reduced by first eight parallel one bit adders, then by four parallel two bit adders, then by two parallel three bit adders, and finally by a single four bit adder. The output of the four bit adder is equal to the sum of the total number of simultaneous events occurring in the set of anodes being examined; since there are two sets of anodes, there are two such circuits as shown in FIG. 9 incorporated into the ASIC 1. A legal event has occurred if one and only one of the anodes experiences an event, i.e., one and only one of the E(i) are asserted high. The final AND gate in FIG. 9 checks the output sum of the four bit adder to insure that this is the case. If the event is legal, the LEGALANODE signal will be asserted high. FIG. 10 shows a circuit which determines if the events on the two sets of anodes form a legal combination. The two sets of anodes are referred to as the TOP anodes and the BOTTOM anodes. Legal anode combinations are examined in a logical sum-of-products form by two stages of NAND gates. The circuit in FIG. 10 asserts the LEGAL COMBINATION signal high if the numbers of anodes illuminated in both axes differ by zero or one, but no more than one.

Figure 11B:
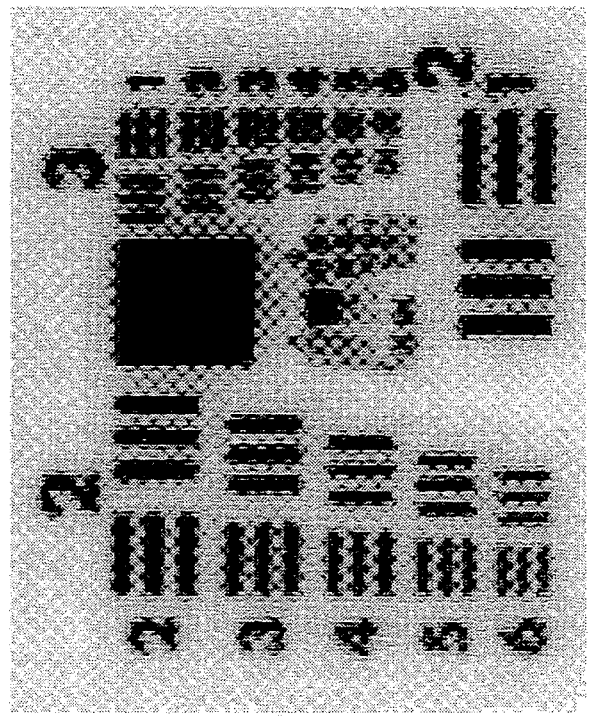
FIG. 11b shows an image of a portion of an Air Force Test Target taken with the high resolution option.
Figure 11A:
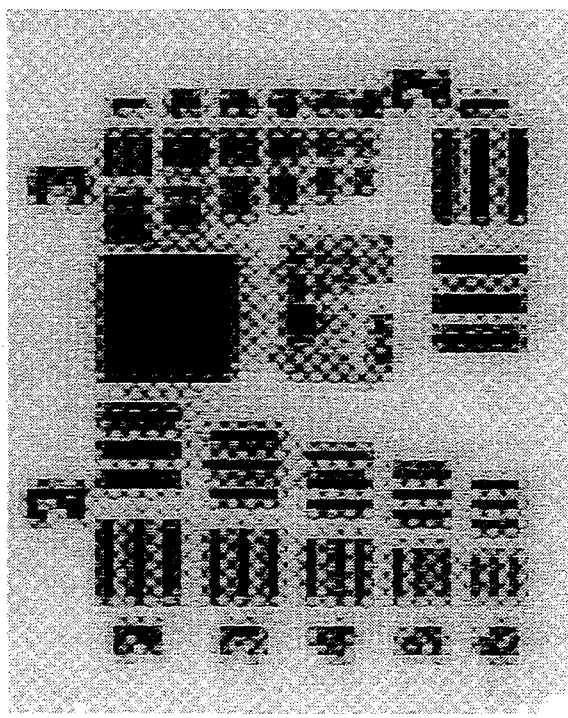
FIG. 11a shows an image of a portion of an Air Force Test Target taken without the high resolution option.
Figure 12A:
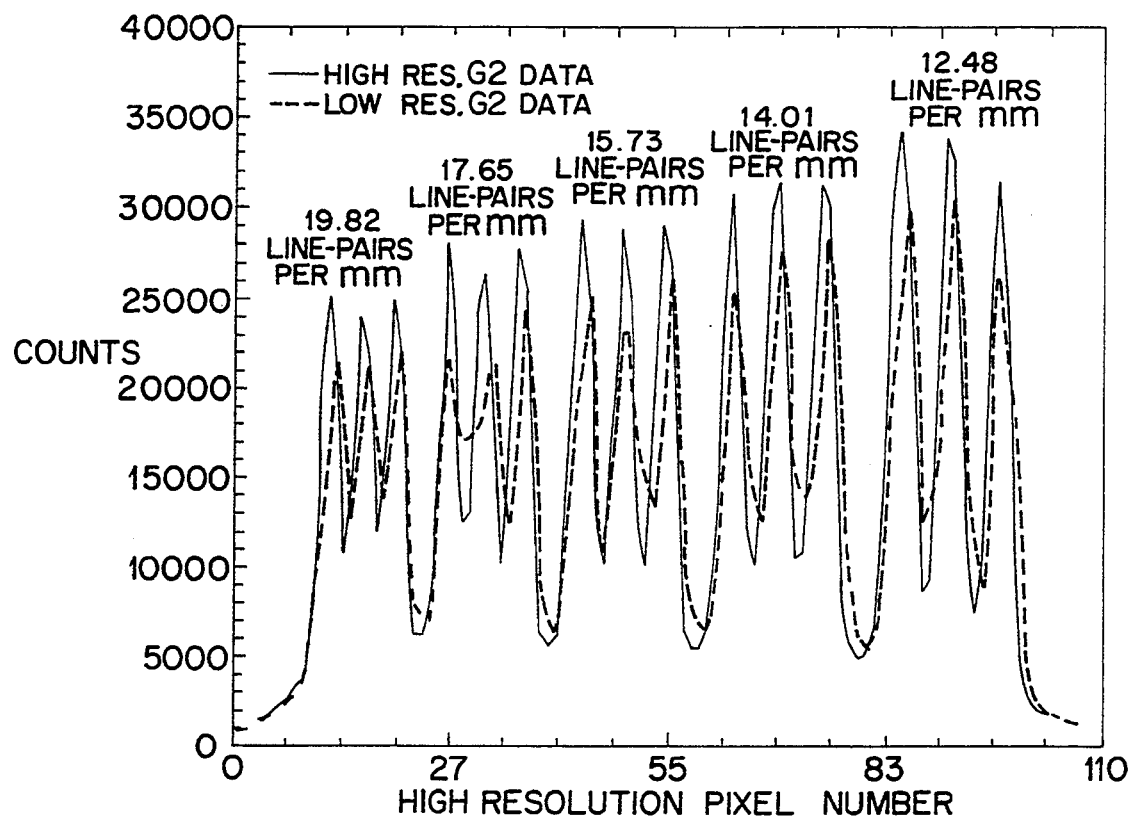
FIG. 12a displays high and low resolution traces through the Group 2 horizontal elements shown in the Air Force Test Targets from FIG. 11.
Figure 12B:
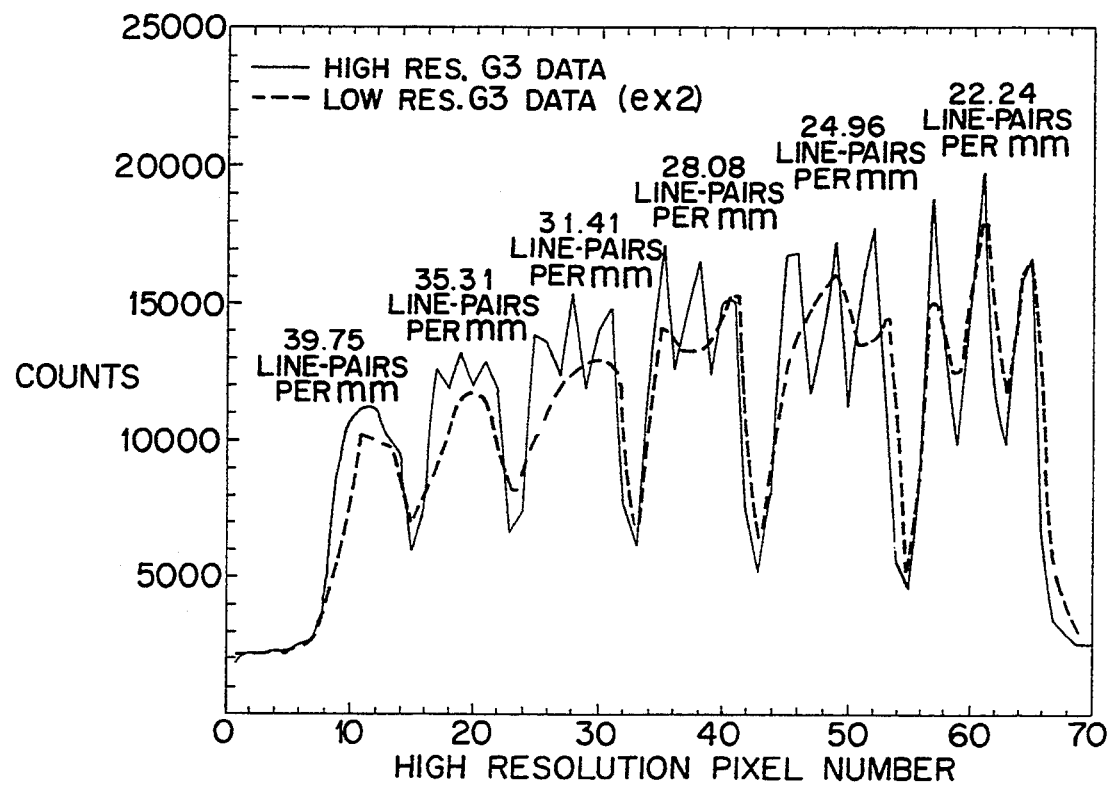
FIG. 12b displays high and low resolution traces through the Group 3 horizontal elements shown in the Air Force Test Targets from FIG. 11.

The high resolution even-odd discrimination algorithm has been successfully tested in preliminary imaging experiments at Stanford University. FIGS. 11a-11b show two images of a portion of an Air Force Test Target, taken with and without the high resolution option. FIG. 11a was imaged in normal resolution mode and is magnified by a factor of two to make its scale identical to that of the high resolution picture in FIG. 11b. While elements 2 through 6 of group 2 are clearly visible on the left side of both figures, the high resolution image shown in FIG. 11b obviously displays greater clarity. In addition, the low resolution image of elements 1 through 6 of group 3 are not resolved, whereas the high resolution image resolves individual bars down to group 3, element 5 for both horizontal and vertical elements. This point is more clearly shown in FIGS. 12a and 12b, which displays traces of brightness as a function of position through the group 2 and group 3 elements for both low and high resolution. Each individual bar of the group 2 elements is clearly visible in FIG. 12a for both high and low resolution, although the peak-to-valley ratio is greater in the high resolution data. FIG. 12b clearly demonstrates the superior resolving power of even-odd discrimination; low resolution resolves only the horizontal element 1 of group 3 whereas high resolution resolves down to element 5. The optical system used for imaging the test pattern onto the detector had a demagnification factor of 2.78.

The line pairs per millimeter of each element of groups 2 and 3 as they appear on the detector are as follows (line-pairs/mm):

Group 2, Element 2: 12.48; Element 3: 14.01; Element 4:15.73 Element 5: 17.65; Element 6:19.82

Group 3, Element 1:22.24; Element 2:24.96; Element 3:28.08 Element 4:31.41; Element 5:35.31; Element 6:39.75

It is important to note that because of sampling errors and imperfections in the imaging optics, the results shown above are actually lower limits to the detector spatial resolution which can be achieved with the high resolution circuit.

The only other method that I am aware of for achieving high resolution decoding with the current generation of MAMA detectors involves employing A/D converters in conjunction with the charge amplifiers to generate a real-time centroid. Given the current state of charge amplifier technology, this would prove very difficult due to charge amplifier nonuniformity and slow recovery time. It is doubtful that higher resolution could be achieved than that already demonstrated with even-odd discrimination, and so it is therefore not worth pursuing (in my opinion).

To those skilled in the art, many modifications and variations of the present invention are possible in light of the above teachings. It is therefore to be understood that the present invention can be practiced otherwise than as specifically described herein and still will be within the spirit and scope of the appended claims.

I claim:

1. A circuit for high resolution decoding of multi-anode microchannel array detectors comprising:

a plurality of input registers accepting transient inputs from an anode array;

anode encoding logic means connected to said plurality of input registers for converting k-fold anode array events into an equivalent two-fold event for an arbitrary k;

a plurality of midpoint pipeline registers connected to said anode encoding logic means for storing said equivalent two-fold events and for storing information pertaining to the number of anodes illuminated in said anode array;

pixel decoding logic means connected to said midpoint pipeline registers for converting said equivalent two-fold events into a corresponding standard ten bit pixel address location;

high resolution algorithm circuit means having a user selectable even-odd discrimination mode and operating in parallel with said pixel decoding logic means for generating a high resolution least significant bit to enhance said multi-anode microchannel array detector's spatial resolution by halving the pixel size and doubling the number of pixels in each axis of said anode array;

multiplexer means connected to said pixel decoding logic means for allowing a user selectable pixel address output according to the actual multi-anode microchannel array detector anode array size;

an output register for concatenating said high resolution least significant bit onto said standard ten bit pixel address location thereby providing a full eleven bit pixel address, and for storing said full eleven bit pixel address; and timing and control state means connected to said plurality of input registers, said anode encoding logic means, and said output register for managing the overall operation of said circuit for high resolution decoding of multi-anode microchannel array detectors.

2. The circuit of claim 1 wherein said plurality of input registers each include edge-triggered flip-flops acting as edge-triggered latches.

3. The circuit of claim 2 wherein said pixel decoding logic means comprises a plurality of ROM look-up tables.

4. The circuit of claim 1 including throw-left and throw-right option for handling odd-ordered anode array event folds.

5. The circuit of claim 4 wherein said throw-left option produces a least significant bit only if said event is odd-fold and said throw-right option produces a least significant bit only if said event is even fold.

6. The circuit of claim 5 comprising three NAND gates, determining whether said event is two-fold, four-fold or six-fold, inputting to a NAND gate combined with an inverter whose output is asserted if said event is an odd-fold event.

7. The circuit of claim 6 further including an XOR gate for user selection of the throw-right option.

* * * * *